(12) United States Patent
Saccucci

(10) Patent No.: US 10,259,527 B2
(45) Date of Patent: Apr. 16, 2019

(54) BICYCLE PEDAL

(71) Applicant: Foresee Pedals LLC, Campbell, CA (US)

(72) Inventor: Darcy Saccucci, Port Coquitlam (CA)

(73) Assignee: Foresee Pedals LLC, Campbell, CA (US)

( * ) Notice: Subject to any disclaimer, the term of this patent is extended or adjusted under 35 U.S.C. 154(b) by 0 days.

(21) Appl. No.: 15/788,480

(22) Filed: Oct. 19, 2017

(65) Prior Publication Data

US 2018/0111658 A1    Apr. 26, 2018

Related U.S. Application Data

(60) Provisional application No. 62/410,788, filed on Oct. 20, 2016, provisional application No. 62/418,547, filed on Nov. 7, 2016.

(51) Int. Cl.
| | | |
|---|---|---|
| *B62M 3/08* | (2006.01) | |
| *G05G 1/50* | (2008.04) | |
| *G05G 1/445* | (2008.04) | |

(52) U.S. Cl.
CPC ............ *B62M 3/08* (2013.01); *G05G 1/445* (2013.01); *G05G 1/50* (2013.01)

(58) Field of Classification Search
CPC .. B62M 1/36; B62M 3/08; G05G 1/30; G05G 1/36; G05G 1/44; G05G 1/445; G05G 1/46; G05G 1/50; G05G 1/506
USPC .............................................. 74/594.1, 594.4
See application file for complete search history.

(56) References Cited

U.S. PATENT DOCUMENTS

| | | | |
|---|---|---|---|
| 4,272,096 A | 6/1981 | Efros | |
| 4,810,040 A * | 3/1989 | Chi ..................... | B60B 27/023 |
| | | | 301/110.5 |
| 6,877,399 B1 | 4/2005 | Swift | |
| 9,896,151 B1 * | 2/2018 | Hsieh ..................... | B62M 3/08 |
| 2002/0152837 A1 * | 10/2002 | Oliveira .................. | B62K 9/02 |
| | | | 74/594.4 |
| 2011/0061491 A1 * | 3/2011 | Chin ...................... | B62M 3/08 |
| | | | 74/594.4 |
| 2012/0048060 A1 * | 3/2012 | Arnold .................... | B62M 3/08 |
| | | | 74/594.4 |
| 2012/0137826 A1 | 6/2012 | Lin | |
| 2013/0068066 A1 * | 3/2013 | Staples ................... | B62M 3/00 |
| | | | 74/594.1 |

(Continued)

OTHER PUBLICATIONS

International Search Report, Written Opinion and Notice of Transmittal of Same for PCT/US2017/057617 dated Jan. 17, 2018.

*Primary Examiner* — Prasad V Gokhale

(74) *Attorney, Agent, or Firm* — Paradice and Li LLP

(57) ABSTRACT

A bicycle pedal is disclosed that consists of a pedal body including a pair of surfaces interchangeably configured to receive a foot and an axle having a first end configured to be received by a crank arm of a bicycle and having a second end received into the pedal body, the axle configured to rotate with respect to the pedal body. The second end of the axle is configured to rotate freely within the pedal body without a bearing system. The bicycle pedals disclosed herein include a fewer number of parts than conventional bicycle pedals, and yet may be stronger and more durable, than conventional bicycle pedals. Further, the bicycle pedals disclosed herein may be manufactured in less time and at lower costs than conventional bicycle pedals.

16 Claims, 19 Drawing Sheets

(56) References Cited

U.S. PATENT DOCUMENTS

| | | | |
|---|---|---|---|
| 2014/0090516 A1* | 4/2014 | Liang | B62M 3/08 |
| | | | 74/594.4 |
| 2015/0053045 A1* | 2/2015 | Barjesteh | B62M 3/08 |
| | | | 74/594.4 |
| 2015/0298762 A1* | 10/2015 | Lin | B62M 3/08 |
| | | | 74/594.4 |
| 2016/0233795 A1* | 8/2016 | Savelli | A43B 3/0015 |

* cited by examiner

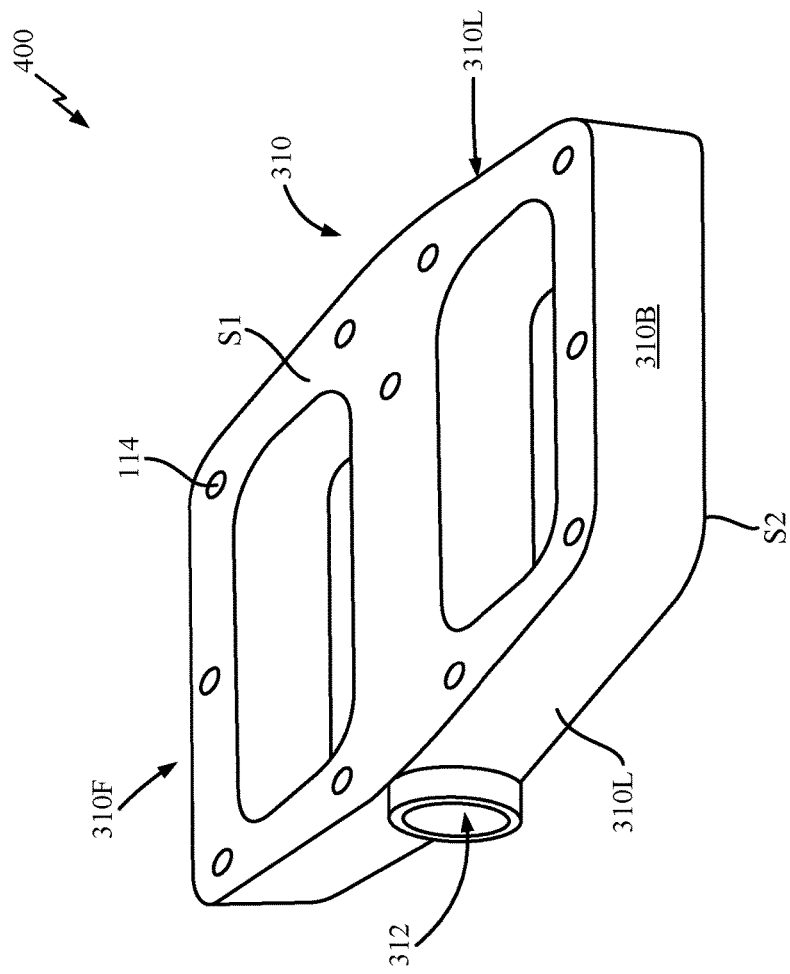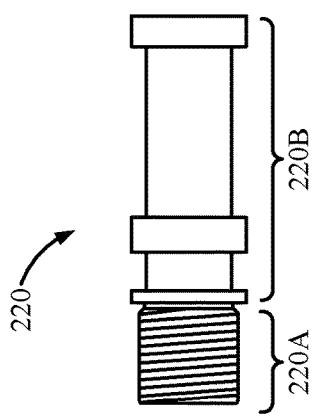
FIG. 4C

600A

```
provide an axle having a first end and a second end, the first end configured to be
received by a crank arm of a bicycle. (602)
```

```
form a pedal body around the second end of the axle using via injection molding.
(604)
  apply a finishing material on a surface of the second end of the axle. (604A)
  insert the second end of the axle into a mold. (604B)
  inject a material into the mold to form the pedal body around the second end of
  the axle. (604C)
```

```
provide an axle having a first end and a second end, the first end configured to be
received by a crank arm of a bicycle. (652)
```

```
form a pedal body around the second end of the axle using via injection molding.
(654)
  apply a finishing material on a surface of the second end of the axle. (654A)
  insert the second end of the axle into a mold. (654B)
  inject liquid plastic into the mold around the axle to form the pedal body around
  the second end of the axle. (654C)
  use chemical curing to cure the liquid plastic until it sufficiently hardens to form
  the pedal body around the second end of the axle. (654D)
```

FIG. 6B

BICYCLE PEDAL

CROSS-REFERENCE TO RELATED APPLICATIONS

This application claims priority under 35 USC 119(e) to and commonly owned U.S. Provisional Patent Application No. 62/410,788 entitled "BICYCLE PEDAL" filed on Oct. 20, 2016 and to co-pending and commonly owned U.S. Provisional Patent Application No. 62/418,547 entitled "BICYCLE PEDAL" filed on Nov. 7, 2016, the entireties of both of which are incorporated by reference herein.

TECHNICAL FIELD

Aspects of the present disclosure relate generally to bicycles and specifically to bicycle pedals.

BACKGROUND

As the popularity of bicycles continues to increase, riders desire bicycle components that are stronger, lighter, and more durable. For example, recent advances in the design and manufacture of bicycle frames, wheels, shocks, and seats have resulted in lighter yet stronger and more durable bicycles. Bicycle manufacturers desire to reduce the cost and complexity of producing bicycle components.

There are a wide variety of bicycle pedals from which riders may choose. Manufacturers offer bicycle pedals in a variety of categories including, for example, "clip-in" bicycle pedals, clipless bicycle pedals, and hybrid bicycle pedals, and offer a range of pedal designs with each of the categories. For example, clipless pedals range in design from basic pedals for casual riding to more advanced pedals with integrated traction pins for competitive riding.

Conventional bicycle pedals typically include many different components, many of which move or rotate with respect to one another. Friction caused by relative movement or rotation of these different bicycle pedal components may undesirably limit the useful life of bicycle pedals. In addition, different bicycle pedal components may be produced by a number of different entities, and assembly of these different bicycle pedal components is typically labor-intensive. As a result, production yield of bicycle pedals may be dependent on a number of factors beyond the control of the bicycle pedal manufacturer.

Thus, a need exists for a bicycle pedal that is more durable and that can be manufactured at a lower cost and with higher production yield than conventional bicycle pedals.

BRIEF DESCRIPTION OF THE DRAWINGS

FIG. 4C is an exploded view of the pedal of FIG. 4A.
FIG. 6A shows an illustrative flow chart of an example operation for manufacturing a pedal.
FIG. 6B shows an illustrative flow chart of another example operation for manufacturing a pedal.

Like reference numerals refer to corresponding parts throughout the drawing figures.

DETAILED DESCRIPTION

Aspects of the present disclosure are described below with respect to a bicycle pedal for simplicity only. It is to be understood that various aspects disclosed herein may be used in conjunction with any device or vehicle for which a person transfers power to a wheel using a pedal. Thus, although described below with respect to a person riding a bicycle, aspects of the present disclosure are equally applicable to unicycles, tricycles, quad-cycles, scooters, and the like. A bicycle pedal is described below that includes a fewer number of parts, and yet may be stronger and more durable, than conventional bicycle pedals. Further, as described in more detail below, the bicycle pedal disclosed herein may be manufactured in less time and at lower costs than conventional bicycle pedals.

Figure 1A:
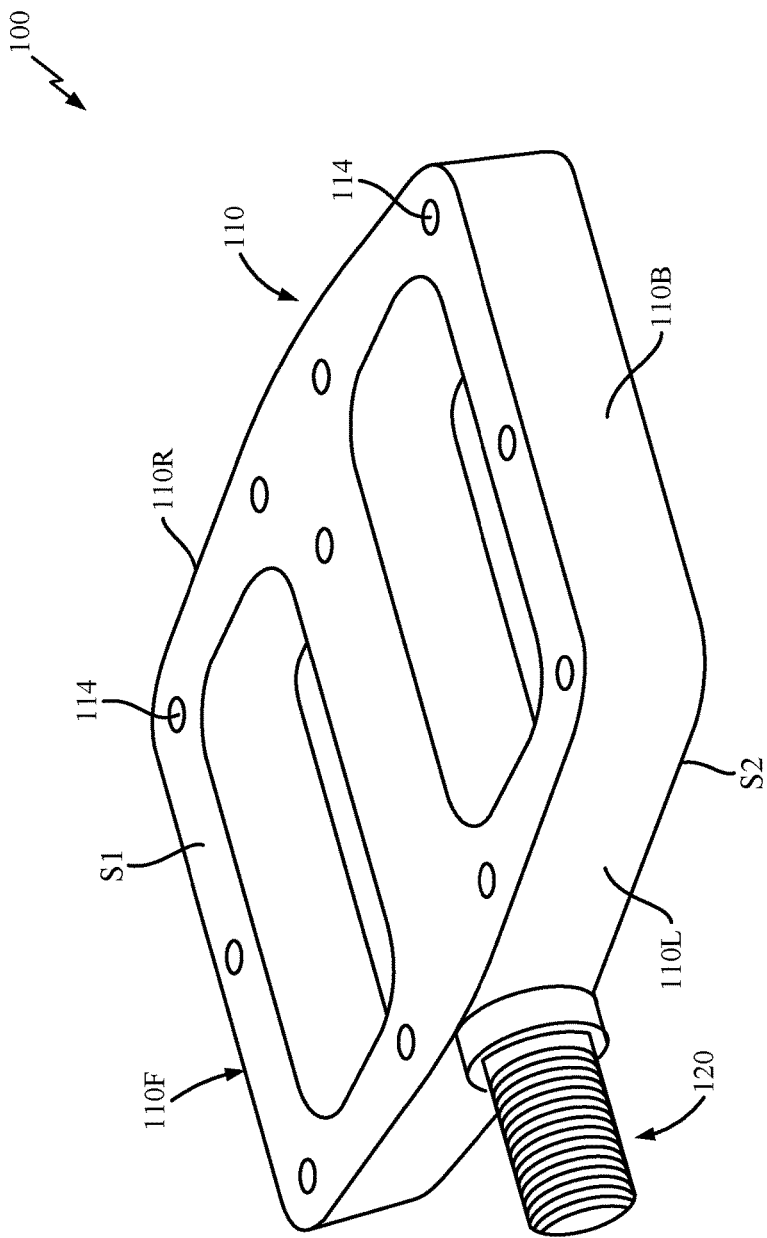
FIG. 1A is a perspective view of an example pedal.

FIGS. 1A-1E depict an example pedal 100 in accordance with the present disclosure. In some aspects, the pedal 100 can include only two pieces. The first piece can be a pedal body 110, and the second piece can be an axle 120. Referring first to FIG. 1A, the pedal body 110 can include a pair of surfaces S1-S2 interchangeably configured to receive a foot of a rider (foot and rider not shown for simplicity). As shown, the pedal 100 can be a dual-sided platform pedal, for example, such that the rider can place a foot on whichever of the two surfaces S1-S2 that is facing upwards. Thus, for the example of FIG. 1A, a rider can place a foot on the top surface S1 to pedal an associated bicycle (not shown for simplicity). However, it is to be understood that the pedal body 110 can rotate so that the bottom surface S2 can become the top surface. The rider's toe can be positioned near the front side 110F of the pedal body 110, and the rider's heel can be positioned near the back side 110B of the pedal body 110.

Although the pedal 100 is depicted as a dual-sided platform pedal, the pedal 100 can be any type of pedal and can have any suitable configuration. For example, the pedal 100 can be a clipless pedal, the pedal 100 can be a hybrid pedal having a platform on one side and clipless on the other, the pedal 100 can be a clip-in pedal, or the pedal 100 can be any other suitable pedal configuration.

The pedal 100 can also be part of a set of pedals with a specific right-side pedal and a specific left side pedal. For purposes of discussion herein, the pedal 100 is a right-side pedal, and is shown to include the aforementioned pair of surfaces S1-S2, a front side 110F, a back side 110B, a left side 110L, and a right side 110R. For reference, the right side 110R of the pedal body 110 is closest to an associated bicycle, and the left side 110L of the pedal body 110 is farther away from the associated bicycle (the bicycle is not shown for simplicity). However, it is to be understood that the pedal 100 as disclosed herein can also be a left side pedal, in which case the right side 110R of the pedal body 110 can become the left side 110L of the pedal body 110, and the left side 110L of the pedal body 110 can become the right side 110R of the pedal body 110. For other implementations, the pedal 100 can also be unspecific to a particular side of the bicycle.

Figure 1B:
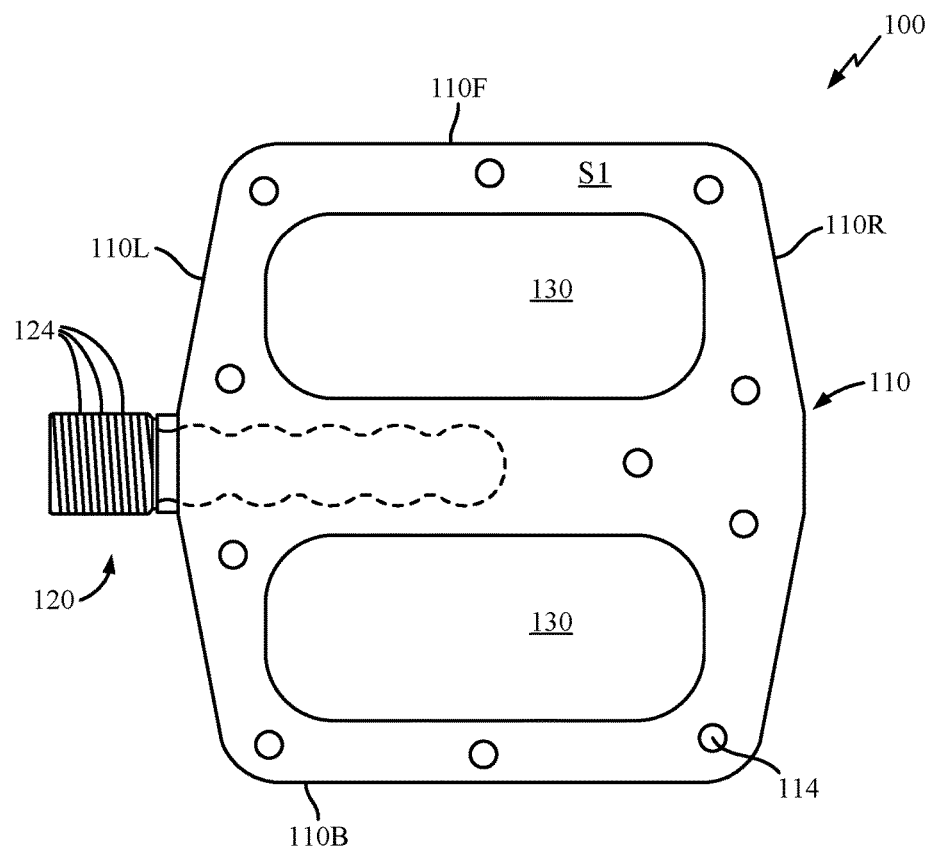
FIG. 1B is a top view of the pedal of FIG. 1A.
Figure 1C:
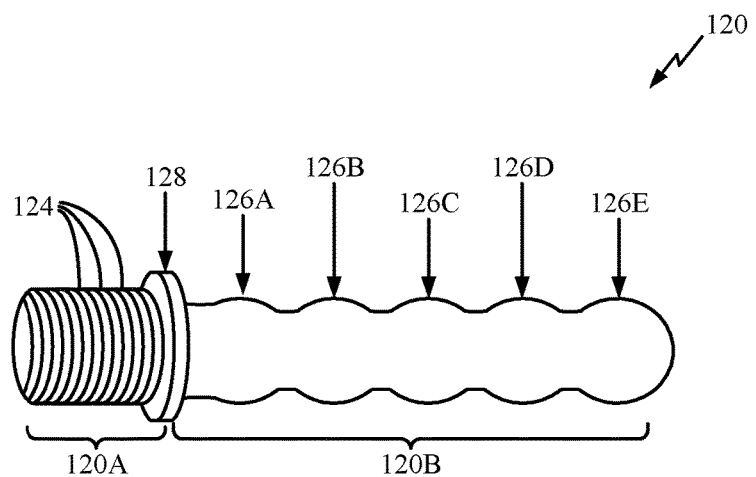
FIG. 1C is a top view of the axle of the pedal of FIG. 1A.
Figure 1D:
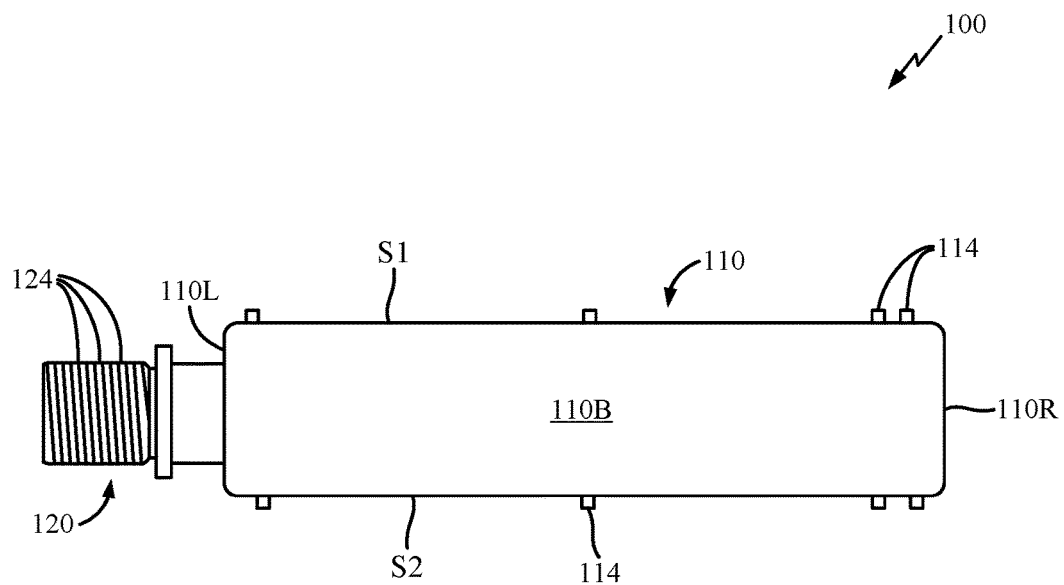
FIG. 1D is an end view of the pedal of FIG. 1A.

Referring also to FIG. 1C, the axle 120 can have a first end 120A and a second end 120B. The first end 120A can be configured to be received by a crank arm attached to a bicycle frame (not shown for simplicity), and the second end 120B can be disposed within the pedal body 110. The axle 120 is configured to rotate within the pedal body 110 without a bearing system. More specifically, for some implementations, the pedal body 110 can be formed around the second end 120B of the axle 120 in such a manner that the second end 120B of the axle 120 can be irremovable disposed within the pedal body 110 and yet freely rotate within the pedal body 110. In some aspects, a finishing material can be formed around or disposed on the second end 120B of the axle 120, for example, to minimize friction between the axle 120 and the pedal body 110 when the axle 120 rotates within the pedal body 110. The finishing material can be any suitable material that allows the axle 120 to freely rotate within the pedal body 110 while at least reducing friction between the axle 120 and the pedal body 110. For one example, the finishing material can be a chrome layer or film formed around or otherwise disposed on the surface of at least a portion of the second end 120B of the axle 120. For another example, the finishing material can be a mold release agent applied to, formed around, or otherwise disposed on the surface of at least a portion of the second end 120B of the axle 120. For yet another example, the finishing material can include both the chrome layer or film and the mold release agent. The mold release agent may be or include any suitable material or agent such as, for example, wax, grease, oil, or a combination of one or more thereof.

In some aspects, the second end 120B of the axle 120 can include a number of protrusions 126A-126E and an integrated ring stop 128. Although five protrusions 126A-126E are depicted in the example of FIG. 1C, the second end 120B of the axle 120 can include any suitable number of such protrusions. The protrusions 126A-126E, which can be of any suitable size or shape, can prevent removal of the axle 120 from the pedal body 110 while also freely rotating within the pedal body 110. The ring stop 128 may form a seal between the axle 120 and the pedal body 110. In other aspects, rather than including a number of protrusions 126, the second end 120B of the axle 120 can include a number of recesses (not shown for simplicity) configured to prevent removal of the axle 120 from the pedal body 110 while also allowing the axle 120 to freely rotate within the pedal body 110. In other aspects, the second end 120B of the axle 120 may not include any protrusions.

For other implementations, the axle 120 can be of a tapered shape. In some aspects, the axle 120 can be tapered such that when disposed within the pedal body 110, a diameter of a distal portion of the axle 120 nearest the right side 110R of the pedal body 110 is greater than a diameter of a proximate portion of the axle 120 nearest the left side 110L of the pedal body 110. In other aspects, the axle 120 can be tapered such that when disposed within the pedal body 110, a diameter of the distal portion of the axle 120 nearest the right side 110R of the pedal body 110 is less than a diameter of the proximate portion of the axle 120 nearest the left side 110L of the pedal body 110.

The axle 120 can be configured to attach to a crank arm on a crank assembly of a bicycle (not shown for simplicity). The axle 120 can allow the rider to use his feet to transfer power to the pedals 100 in an up and down motion as the crank arms and axles 120 travel around in a generally circular motion, thereby facilitating motion of the bicycle (such as by way of a chain connected between a rear wheel of the bicycle and a sprocket attached to the crank arms). In some aspects, the first end 120A of the axle 120 can include a number of threads 124 or other features to secure the axle 120 and pedal body 110 to the crank arm. The threads 124 can be configured to attach to a threaded hole in the crank arm using any suitable techniques. The diameter of the first end 120A of the axle 120 can be any suitable value, for example, to mate with an associated crank arm.

Figure 1E:
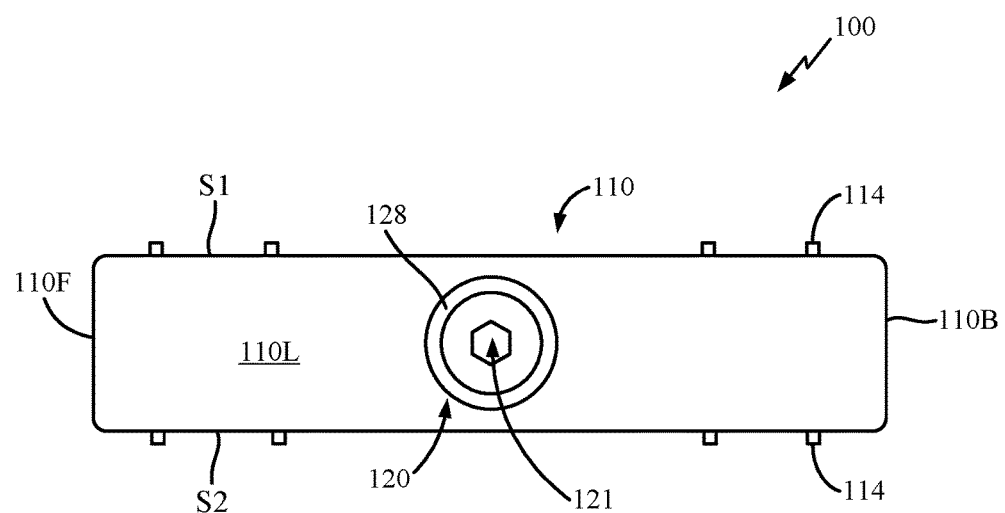
FIG. 1E is a side view of the pedal of FIG. 1A.

For some implementations, the first end 120A of the axle 120 can include a socket 121 to allow a tool to tightly secure the pedal 100 to the crank arm, for example, as depicted in the example of FIG. 1E. Although depicted as a hex shape, the socket 121 can be any suitable shape or size. For other implementations, the first end 120A of the axle 120 may not include the socket 121, and other suitable techniques can be used to secure the axle 120 to the crank arm.

The axle 120 can be a monolithic structure. For example, the axle 120 may be a single piece of material, and the threads 124, the protrusions 126, and the ring stop 128 can be forged or otherwise formed within the single piece of material. The single piece of material from which the axle 120 is formed can be any suitable durable material including, for example, aluminum, steel, titanium, magnesium, composite, carbon fiber, or the like.

The pedal body 110 can include one or more cut outs or holes 130, for example, as depicted in FIG. 1B. The holes 130 can reduce the overall weight of the pedal body 110. The pedal body 110 can also include a number of traction pins 114, for example, as depicted in FIGS. 1A-1E. The traction pins 114 can be used to increase a rider's ability to maintain a foot on the pedal body 110, for example, during wet or slippery conditions.

The pedal body 110 can be a unibody structure that is formed around the second end 120B of the axle 120, and can be of any suitable material. In some implementations, the pedal body 110 can be a piece of plastic that is injection molded around the second end 120B of the axle 120. In other implementations, the pedal body 110 can be formed by using a mold to provide liquid plastic around the second end 120B of the axle 120, and then curing the liquid plastic using a suitable chemical curing process until the liquid plastic hardens (such as by using an oven to heat the liquid plastic until it becomes sufficiently hardened to form the pedal body 110).

FIGS. 2A-2E depict another bicycle pedal 200 in accordance with the present disclosure. The bicycle pedal 200 is similar to the bicycle pedal 100 described above with respect to FIGS. 1A-1E, except that the pedal 200 can include an axle 220 rather than the axle 120 described above. For example, the pedal 200 can include the pedal body 110 described above with respect to FIGS. 1A-1E, and can include the axle 220 having a first end 220A and a second end 220B. The first end 220A of the axle 220 can be configured to attach to a crank arm on a crank assembly of a bicycle (not shown for simplicity) in a manner similar that described above with respect to FIGS. 1A-1E. Similarly, the diameter of the first end 220A of the axle 220 can be any suitable value, for example, to mate with an associated crank arm.

Figure 2A:
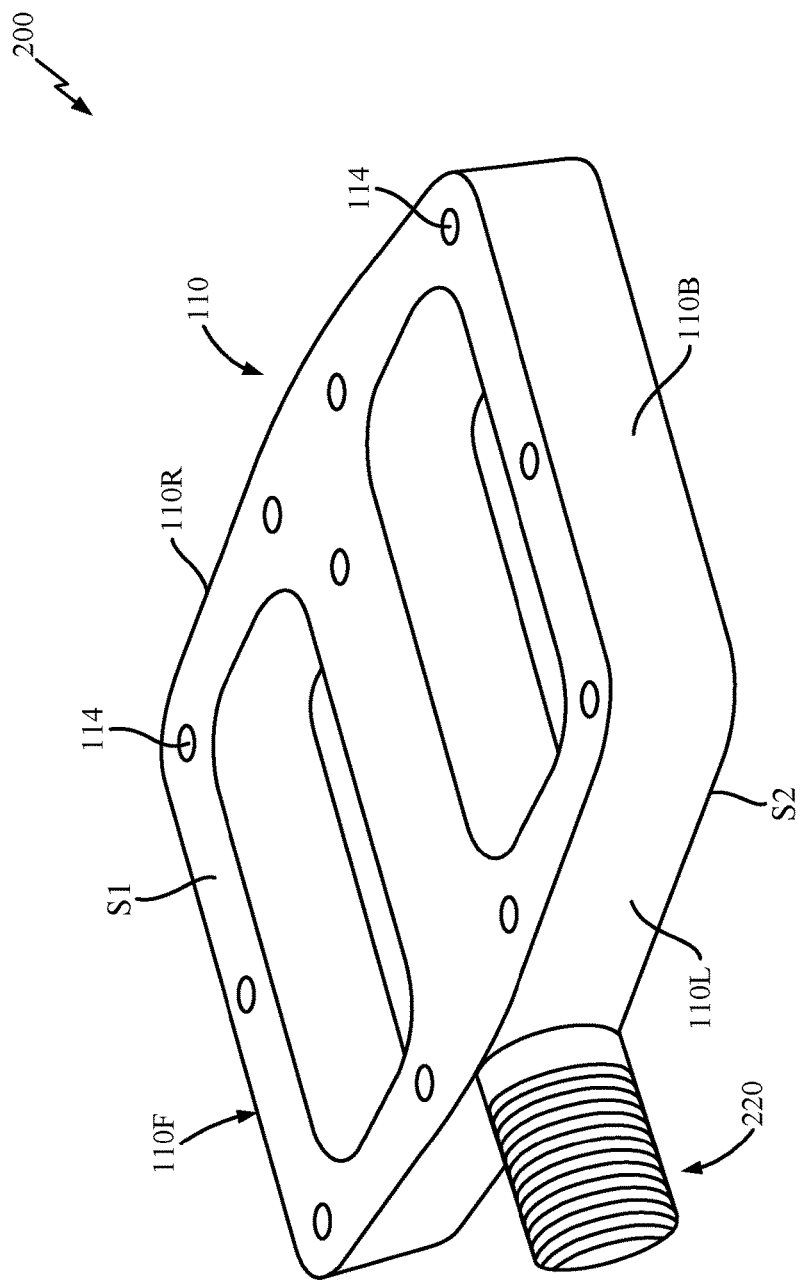
FIG. 2A is a perspective view of another example pedal.
Figure 2B:
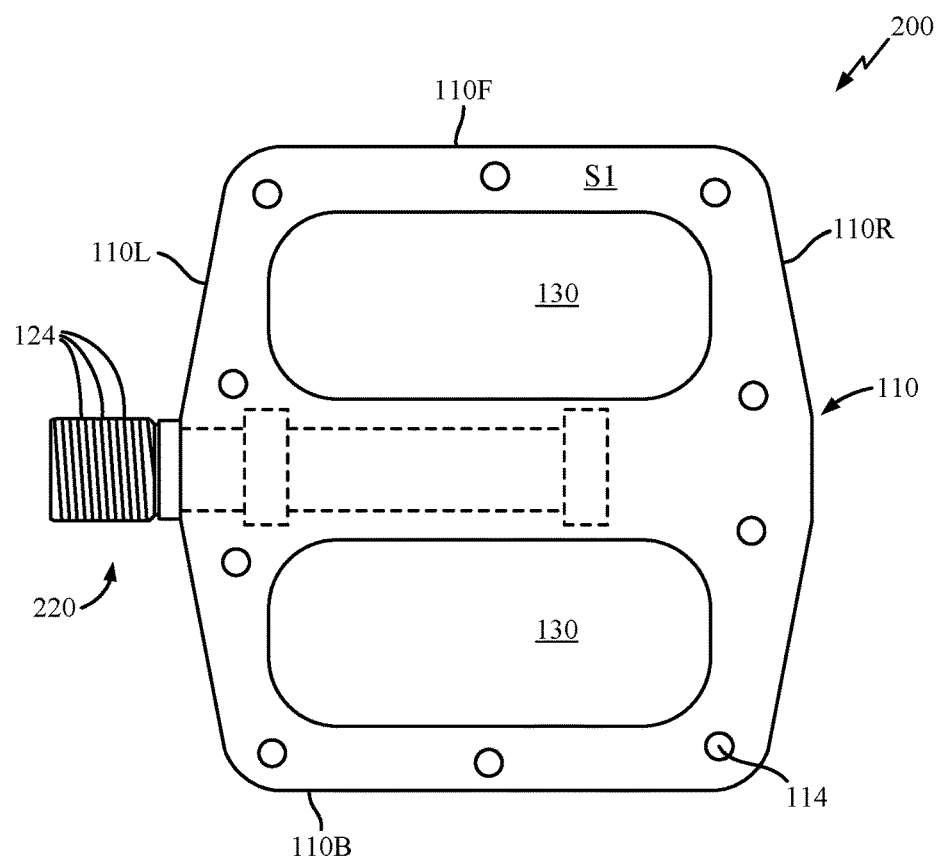
FIG. 2B is a top view of the pedal of FIG. 2A.
Figure 2C:
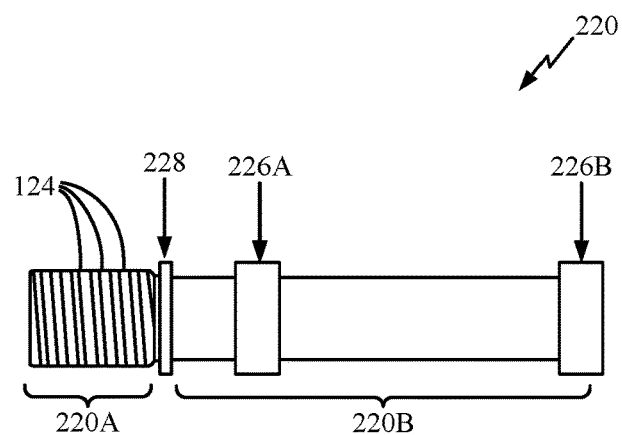
FIG. 2C is a top view of the axle of the pedal of FIG. 2A.
Figure 2D:
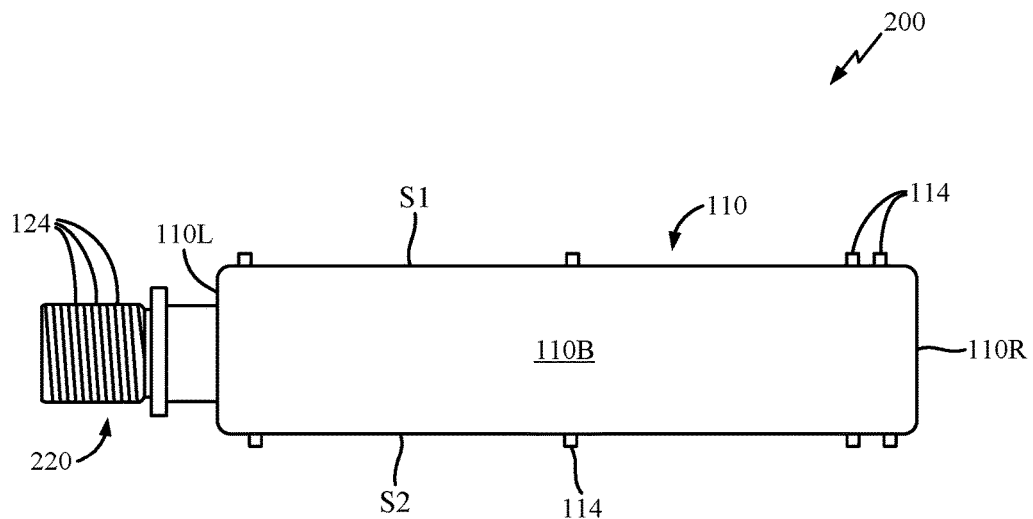
FIG. 2D is an end view of the pedal of FIG. 2A.
Figure 2E:
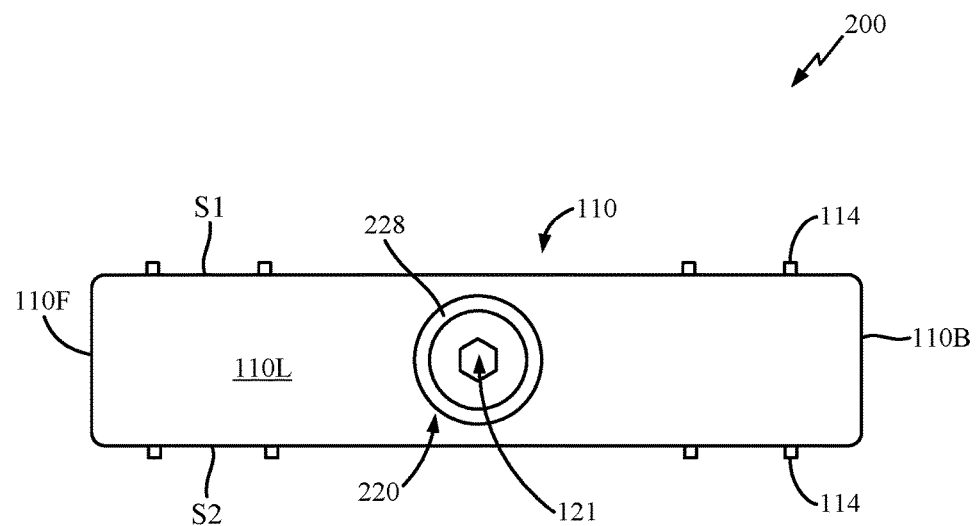
FIG. 2E is a side view of the pedal of FIG. 2A.

Referring to FIG. 2C, the axle 220 can include a pair of rectangular-shaped protrusions 226A-226B, for example, rather than the spherical-shaped protrusions 126A-126E of the axle 120 described above. Although two protrusions 226A-226B are depicted in the example of FIG. 2C, the second end 220B of the axle 220 can include any suitable number of such protrusions. The protrusions 226A-226B, which can be of any suitable size or shape, can prevent removal of the axle 220 from the pedal body 110 while also freely rotating within the pedal body 110. A ring stop 228 may form a seal between the axle 220 and the pedal body 110. In some aspects, the second end 220B of the axle 220 can include a number of protrusions 226A-126B and an integrated ring stop 228. Although two protrusions 226A-226B are depicted in the example of FIG. 2C, the second end 220B of the axle 220 can include any suitable number of such protrusions. The protrusions 226A-226B, which can be of any suitable size or shape, can prevent removal of the axle 220 from the pedal body 110 while also freely rotating within the pedal body 110. The ring stop 228 may form a seal between the axle 220 and the pedal body 110. In other aspects, rather than including a number of protrusions 226, the second end 220B of the axle 220 can include a number of recesses (not shown for simplicity) configured to prevent removal of the axle 220 from the pedal body 110 while also allowing the axle to freely rotate within the pedal body 110. In other aspects, the second end 220B of the axle 220 may not include any protrusions.

The axle 220 can be a monolithic structure. For example, the axle 220 may be a single piece of material, and the threads 124, the protrusions 226, and the ring stop 228 can be forged or otherwise formed within the single piece of material. The single piece of material from which the axle 220 is formed can be any suitable durable material including, for example, aluminum, steel, titanium, magnesium, composite, carbon fiber, or the like.

For other implementations, the axle 120 can be of a tapered shape. In some aspects, the axle 120 can be tapered such that when disposed within the pedal body 110, a diameter of a distal portion of the axle 120 nearest the right side 110R of the pedal body 110 is less than a diameter of a proximate portion of the axle 120 nearest the left side 110L of the pedal body 110. In other aspects, the axle 120 can be tapered such that when disposed within the pedal body 110, a diameter of the distal portion of the axle 120 nearest the right side 110R of the pedal body 110 is greater than a diameter of the proximate portion of the axle 120 nearest the left side 110L of the pedal body 110

The axle 220 is configured to rotate within the pedal body 110 without a bearing system. More specifically, the pedal body 110 can be formed around the second end 220B of the axle 220 in such a manner that the second end 220B of the axle 220 can be irremovable disposed within the pedal body 110 and yet freely rotate within the pedal body 110. In some aspects, a finishing material can be formed around or disposed on the second end 220B of the axle 220, for example, to minimize friction between the axle 220 and the pedal body 110 when the axle 220 rotates within the pedal body 110. The finishing material can be any suitable material that allows the axle 220 to freely rotate within the pedal body 110 while at least reducing friction between the axle 220 and the pedal body 110. For one example implementation, the finishing material can be a chrome layer or film formed around or otherwise disposed on the surface of at least a portion of the second end 220B of the axle 220. For one example, the finishing material can be a chrome layer or film formed around or otherwise disposed on the surface of at least a portion of the second end 220B of the axle 220. For another example, the finishing material can be a mold release agent applied to, formed around, or otherwise disposed on the surface of at least a portion of the second end 220B of the axle 220. For yet another example, the finishing material can include both the chrome layer or film and the mold release agent. The mold release agent may be or include any suitable material or agent such as, for example, wax, grease, oil, or a combination of one or more thereof.

The pedals 100 and 200 described above with respect to FIGS. 1A-1E and FIGS. 2A-2E have a number of advantages over conventional pedals. For example, because the pedals 100 and 200 each include only two pieces, manufacturing costs and complexities of the pedals 100 and 200 can be significantly reduced, for example, as compared with conventional pedals that can include dozens of different pieces or components. In addition, the simplicity which with the pedals 100 and 200 can be manufactured can also significantly increase production yield, as compared with the aforementioned conventional pedals. For example, conventional pedals typically include a spindle that is received within a pedal body using a bearing system that allows the spindle to rotate with respect to the pedal body. The bearing system can include an inner bearing race, an outer bearing race, and a plurality of ball bearing or needle bearings. The inner bearing race typically includes one or more nuts, washers, and rings, and the outer bearing race typically includes one or more bearing seals, washers, and retainer rings. These conventional bearing systems are typically made by hand, and their assembly can be very labor-intensive due to the large number of individual components associated with the bearing system. Furthermore, after the bearing system is assembled, additional labor is required to thread the spindle through the bearing system, insert the spindle and bearing system into a hole or slot within the pedal body, and then secure the spindle and bearing system to the pedal body. In addition to the logistical and storage costs associated with maintaining an adequate supply for each of the various individual components that form these conventional bearing systems, the overall factory yield for producing such conventional pedals may be prone to defects in one or more of these individual components, particularly when different components are manufactured by different entities that can be located in different places.

Because the pedals 100 and 200 disclosed herein each include only two pieces (the pedal body 110 and either the axle 120 or the axle 220), the pedals 100 and 200 can be manufactured more quickly using fewer resources than conventional pedals described above. In addition, because the pedals 100 and 200 do not include a bearing system, the logistical and storage costs associated with maintaining an adequate supply for each of the various individual components that form a bearing system can be avoided during manufacture of pedals 100 and 200, which can not only significantly reduce the cost of materials and labor to manufacture the pedals 100 and 200, but can also increase production yield of the pedals 100 and 200. For one example, because the pedals 100 and 200 do not include complicated bearing systems, an entity that manufactures the pedals 100 and 200 does not need to maintain or track inventory supplies of a variety of different components—which as mentioned above may be provided by different entities located in different places. In this manner, an entity that manufacturers the pedals 100 and 200 can eliminate space to store such variety of different components, can eliminate or at least reduce inventory and supply chain management, and can eliminate or at least reduce the costs of detecting, returning, and replacing defective parts associated with conventional bearing systems. An example method for manufacturing the pedal 100 is described in detail below with respect to FIGS. 5A-5E and 6.

Figure 3A:
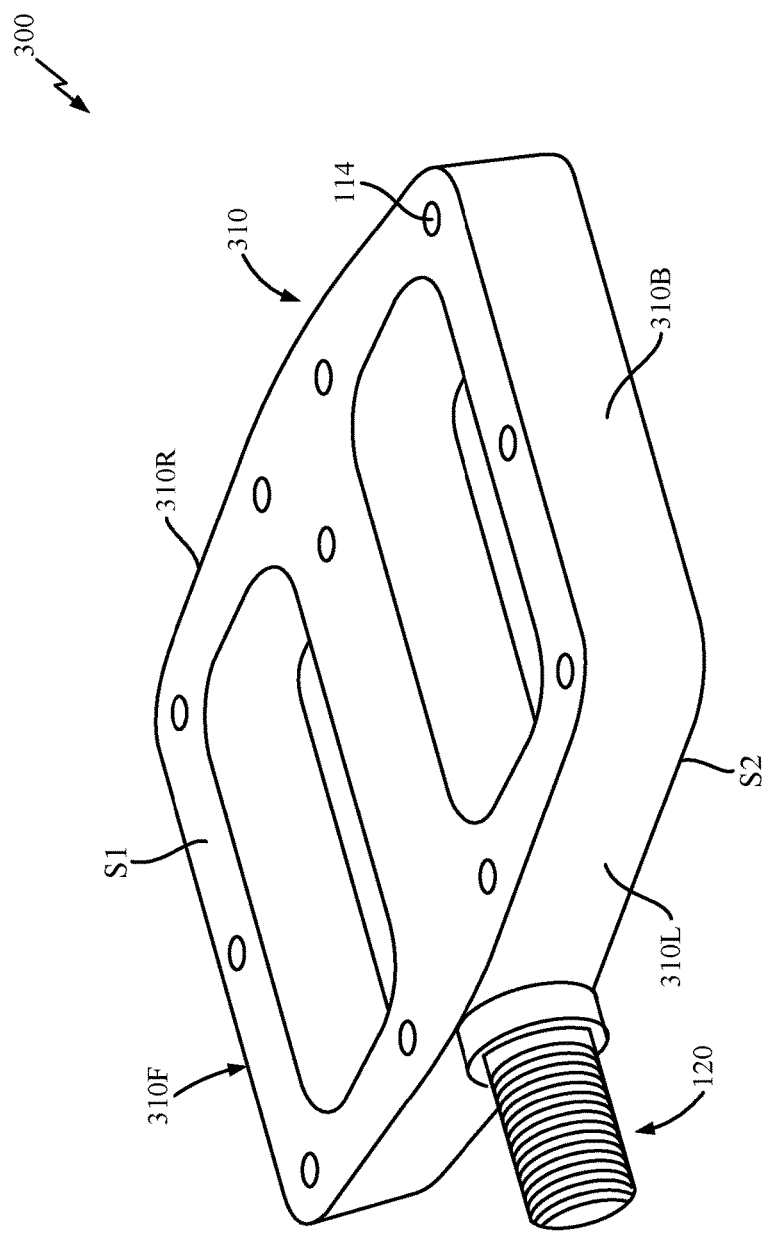
FIG. 3A is a perspective view of another example pedal.
Figure 3B:
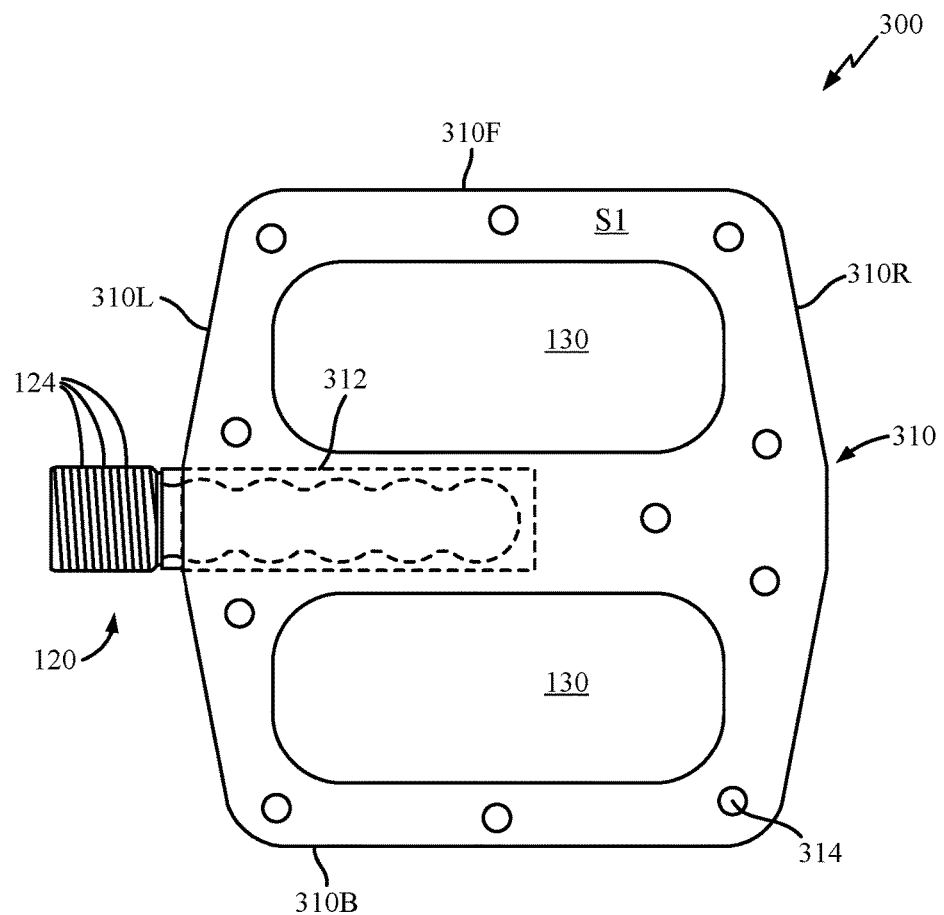
FIG. 3B is a top view of the pedal of FIG. 3A.
Figure 3C:
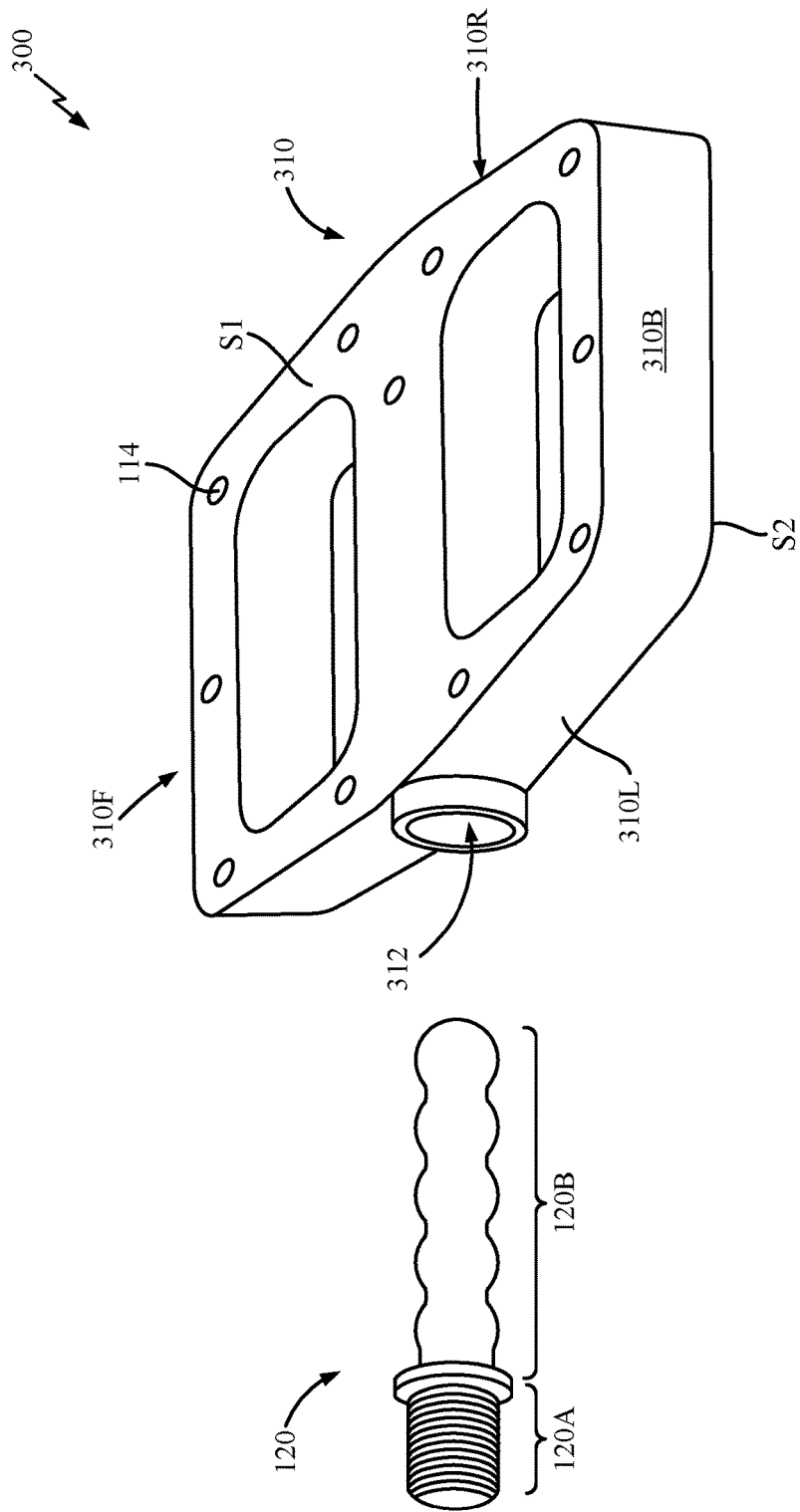
FIG. 3C is an exploded view of the pedal of FIG. 3A.

FIGS. 3A-3C depict another bicycle pedal 300 in accordance with the present disclosure. The bicycle pedal 300 is shown to include a pedal body 310 and the axle 120. The axle 120 is described above with respect to FIGS. 1A-1E. The pedal body 310 can be similar in shape and function to the pedal body 110 described above, except that the pedal body 310 can include a cavity 312 within which the second end 120B of the axle 120 can be inserted and thereafter irremovably disposed. The cavity 312 may be of any suitable size and shape that allows the second end 120B of the axle 120 to be disposed in and freely rotate within the cavity 312. After the axle 120 is inserted into the cavity 312, a filler material such as plastic can be inserted into the cavity 312 to fill or plug any space between the second end 120B of the axle and the cavity 312. In some implementations, the filler material can be a plastic injection molding (or other suitable filler material). In other implementations, the pedal body 110 can be formed by using a mold to provide liquid plastic around the second end 120B of the axle 120, and then curing the liquid plastic using a suitable chemical curing process until the liquid plastic hardens (such as by using an oven to heat the liquid plastic until it becomes sufficiently hardened to form the pedal body 110).

The pedal body 310 can be manufactured as multiple components, for example, that can be pressed or molded together using any suitable fabrication process. For one example, the pedal body 310 can be die cast from aluminum, cold forged from aluminum, or extruded from aluminum and then CNC machined. For another example, the pedal body 310 can be made from aluminum, steel, titanium, magnesium, composite, carbon fiber, or the like.

Figure 4A:
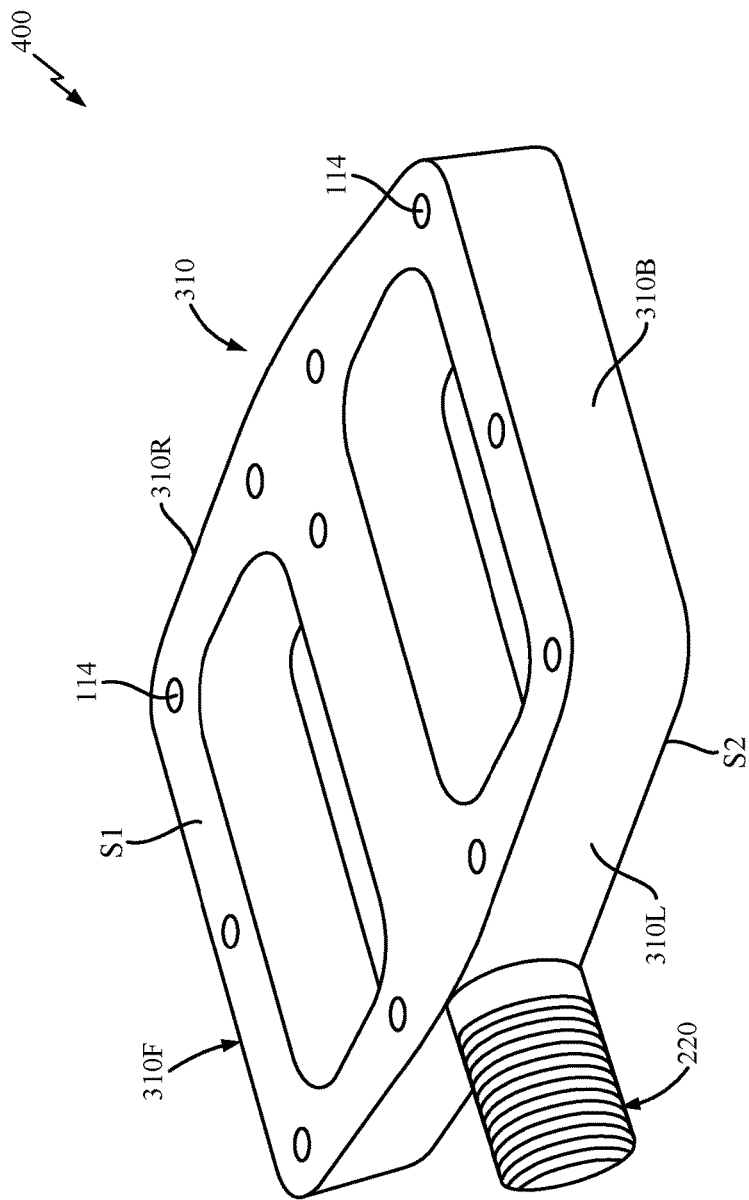
FIG. 4A is a perspective view of another example pedal.
Figure 4B:
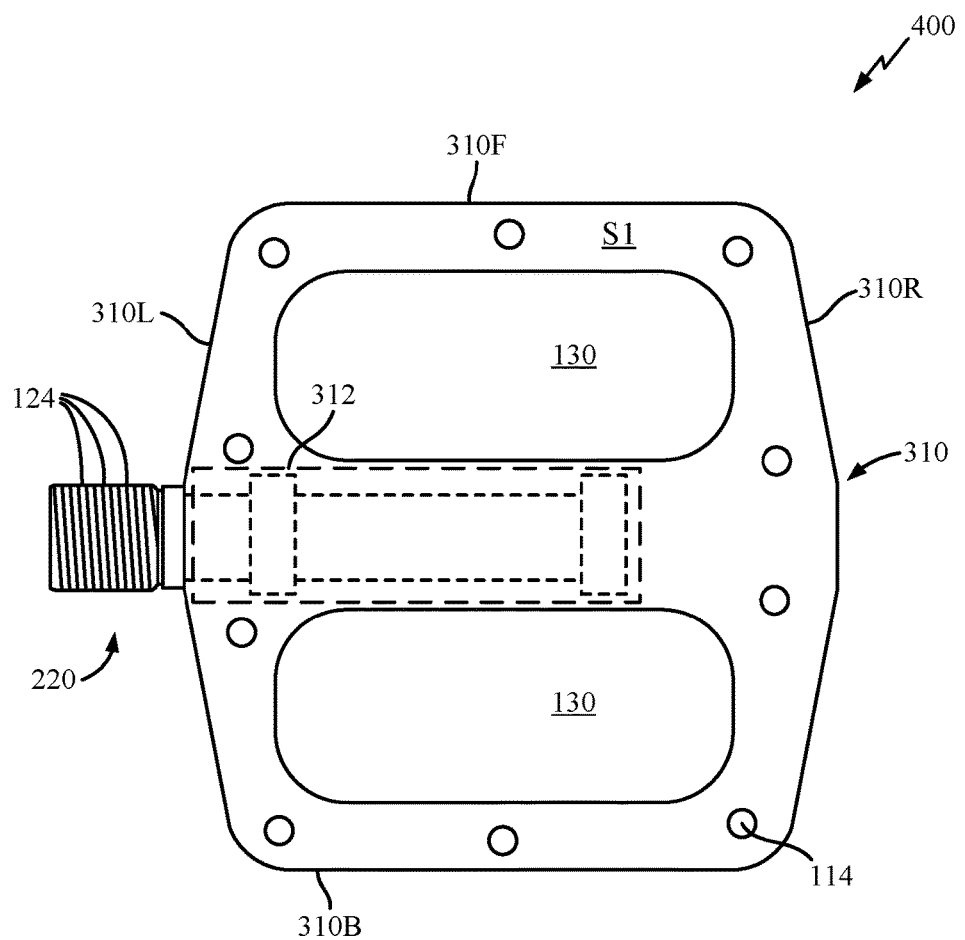
FIG. 4B is a top view of the pedal of FIG. 4A.

FIGS. 4A-4C depict another bicycle pedal 400 in accordance with the present disclosure. The bicycle pedal 400 is shown to include the pedal body 310 and the axle 220. The axle 220 is described above with respect to FIGS. 2A-2E, and the pedal body 310 can be similar to the pedal body 310 described above with respect to FIGS. 3A-3C.

Figure 5A:
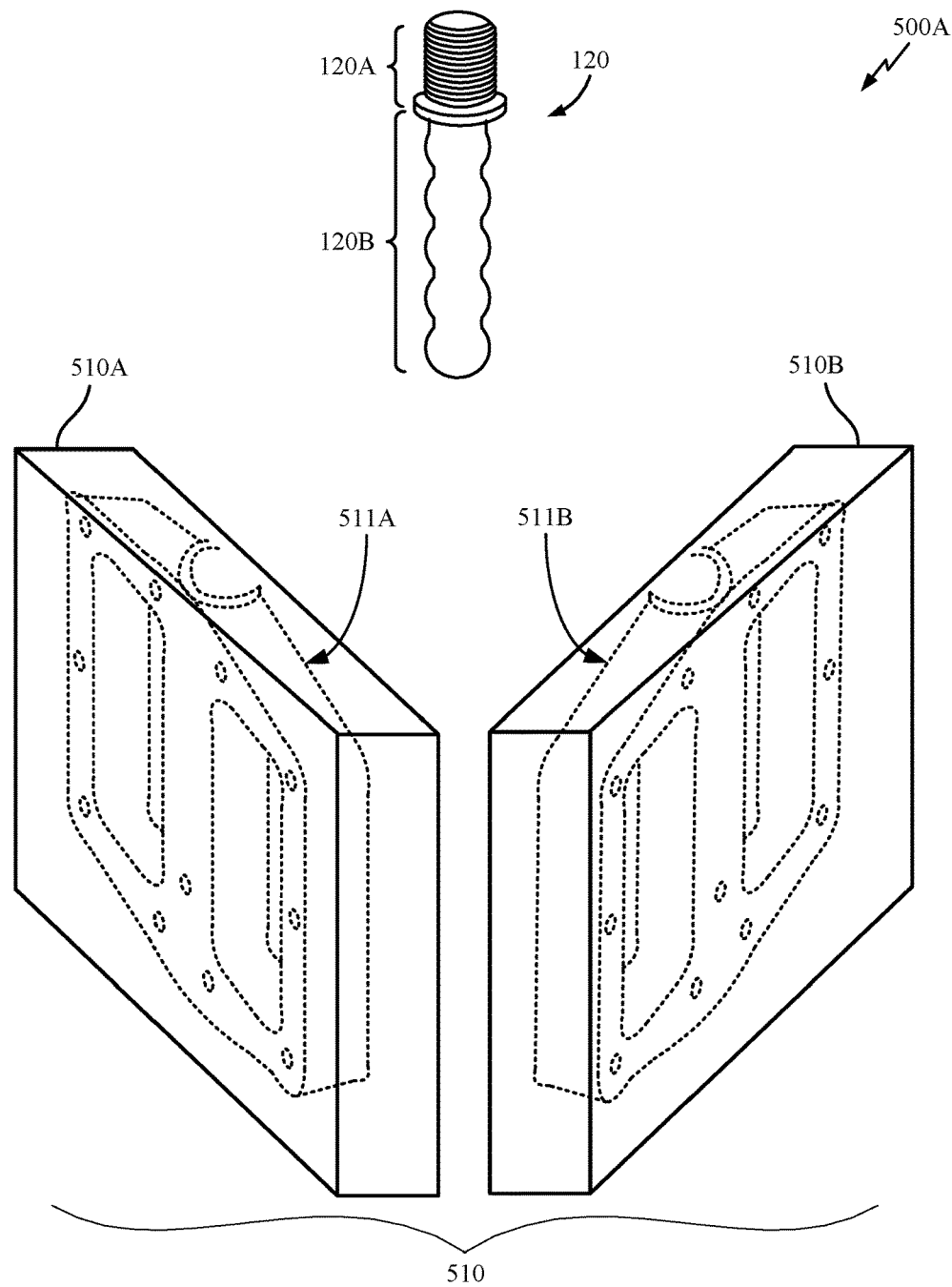
FIGS. 5A-5E depict an example method for manufacturing a pedal.

An example method for manufacturing the pedal 100 of FIGS. 1A-1E is described below with respect to FIGS. 5A-5D. Although described below with respect to the pedal 100 of FIGS. 1A-1E, the method is equally applicable to manufacturing the pedal 200 described above with respect to FIGS. 2A-2E, as well as for manufacturing pedal 100 to include other shapes and configurations of axle 120. The method is described below with respect to illustrations 500A-500D shown in FIGS. 5A-5D, respectively. Referring first to the illustration 500A depicted in FIG. 5A, the axle 120 can be manufactured using any suitable technique, and then aligned for insertion into a mold 510. As shown in FIG. 5A, the mold 510 can include a first half 510A and a second half 510B. The first half 510A of the mold 510 can include a first cavity 511A configured to assist in the formation of a first half of the pedal body 110, and the second half 510B of the mold 510 can include a second cavity 511B configured to assist in the formation of a second half of the pedal body 110. Although referred to as cavities herein, it is to be understood that the cavities 511A-511B depicted in FIGS. 5A-5D can be any suitable cavity, depression, recess, or void within which the pedal body 110 can be formed using injection molding techniques or chemical curing techniques to cure liquid plastic until the liquid plastic sufficiently hardens to form the pedal body 110.

Figure 5C:
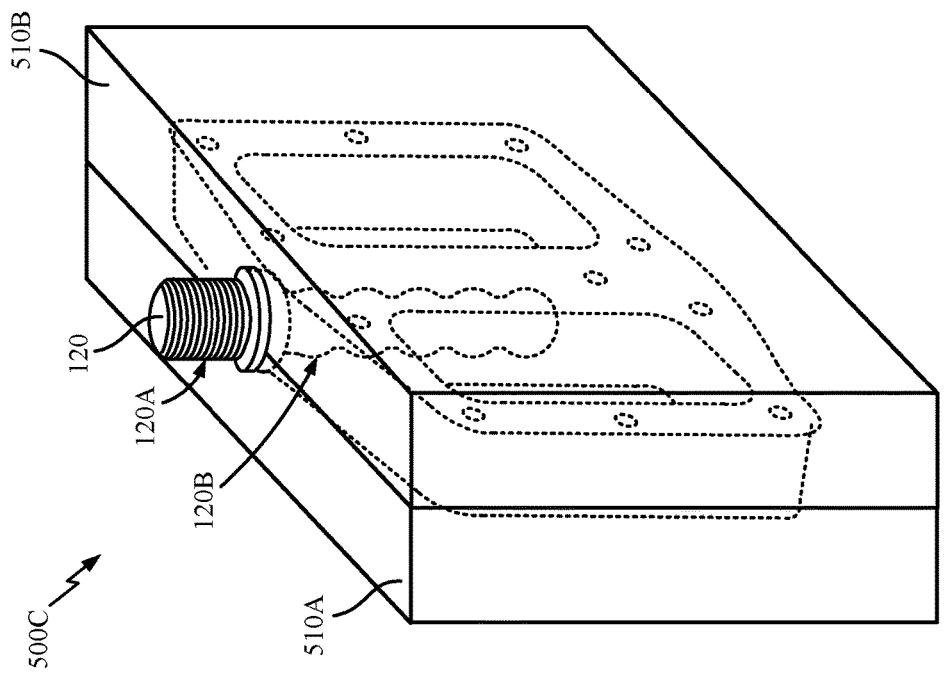
Figure 5B:
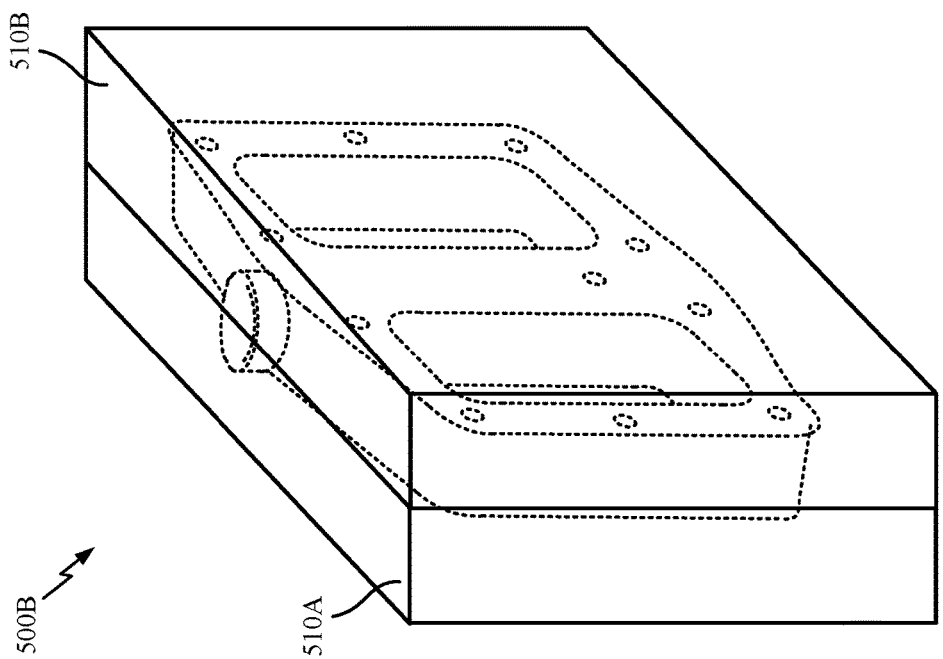

After the first and second halves 510A-510B of the mold 510 are closed, as depicted by the illustration 500B of FIG. 5B, the axle 120 can be placed or inserted inside the mold 510, as depicted by the illustration 500C of FIG. 5C. For some implementations, only the second end 120B of the axle 120 is inserted into the mold cavity 511, thereby leaving the first end 120A of the axle 120 outside of the mold 510. As mentioned above, in some aspects, a finishing material can be formed around or disposed on the second end 120B of the axle 120, for example, to minimize friction between the axle 120 and the pedal body 110 after manufacture. In addition, or as an alternative, a mold release agent can be applied to, formed around, or otherwise disposed on the surface of at least a portion of the second end 120B of the axle 120 prior to or upon its insertion into the mold 510. Either or both of the finishing material and the mold release agent can assist in preventing the pedal material from adhering to the axle 120 during manufacture of the pedal 100 and can allow the axle 120 to freely rotate within the pedal body 110 after manufacture of the pedal 100.

In some implementations, a material can be injected into the mold 510 at a high pressure to cover and encapsulate the second end 120B of the axle 120 with the material, thereby integrally forming the pedal body 110. Any suitable injection molding thermoplastic resins (such as, for example, nylon and polycarbonate) can be used as the material to form the pedal body 110 around second end 120B of the axle 120 within the mold 510. In other implementations, the pedal body 110 can be formed by using a mold to provide liquid plastic around the second end 120B of the axle 120, and then curing the liquid plastic using a suitable chemical curing process until the liquid plastic hardens (such as by using an oven to heat the liquid plastic until it becomes sufficiently hardened to form the pedal body 110).

Figure 5D:
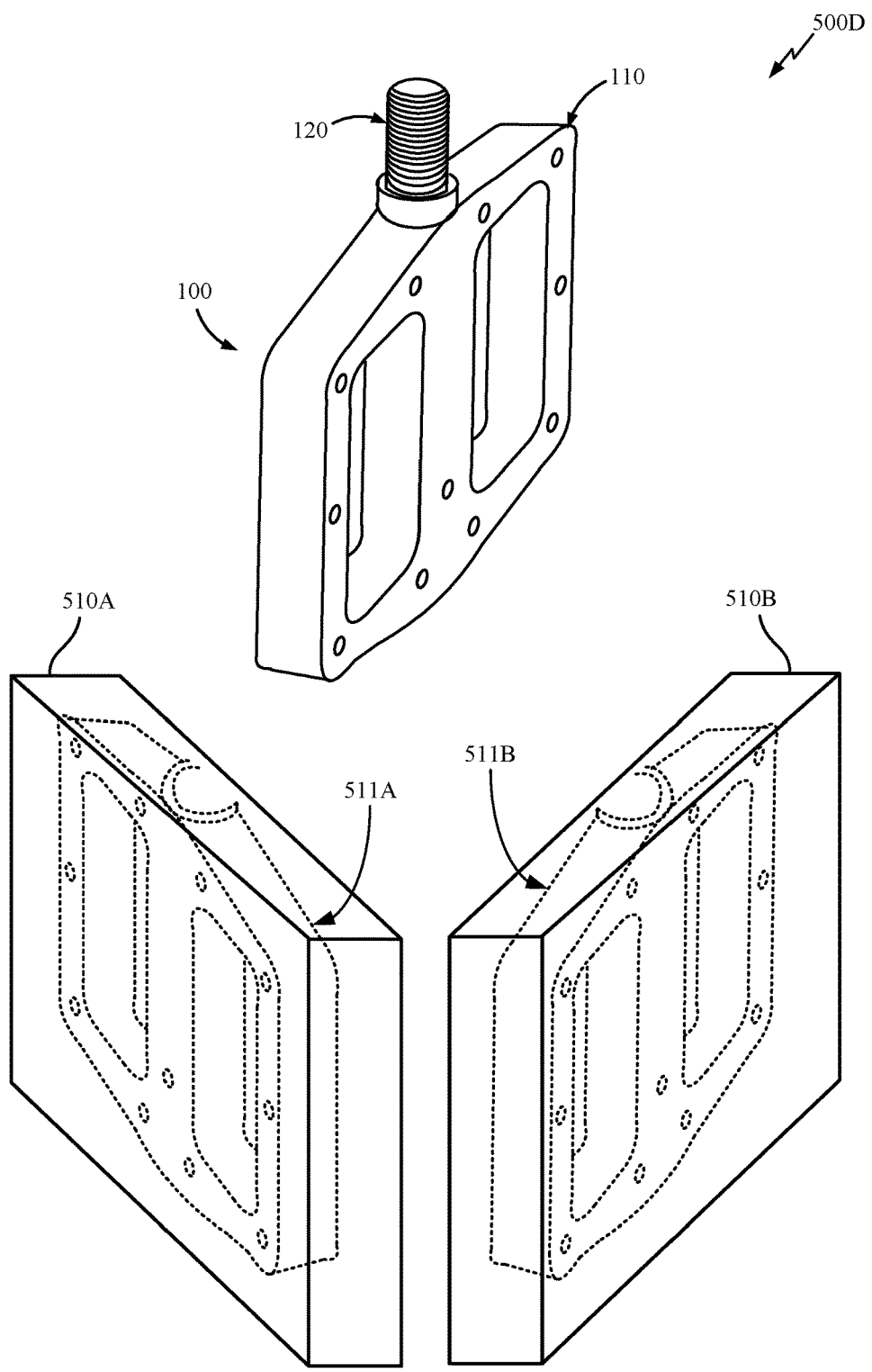

After the pedal body 110 is integrally formed around the second end 120B of the axle 120, the mold 510 can be opened, and the completed pedal 100 can be removed as a single piece from the mold 510, as depicted by the illustration 500D of FIG. 5D. Specifically, after the pedal 100 is removed from the mold 510, the second end 120B of the axle 120 is irremovably disposed within and mated with the pedal body 110, and is also able to rotate freely within the pedal body 110.

Figure 5E:
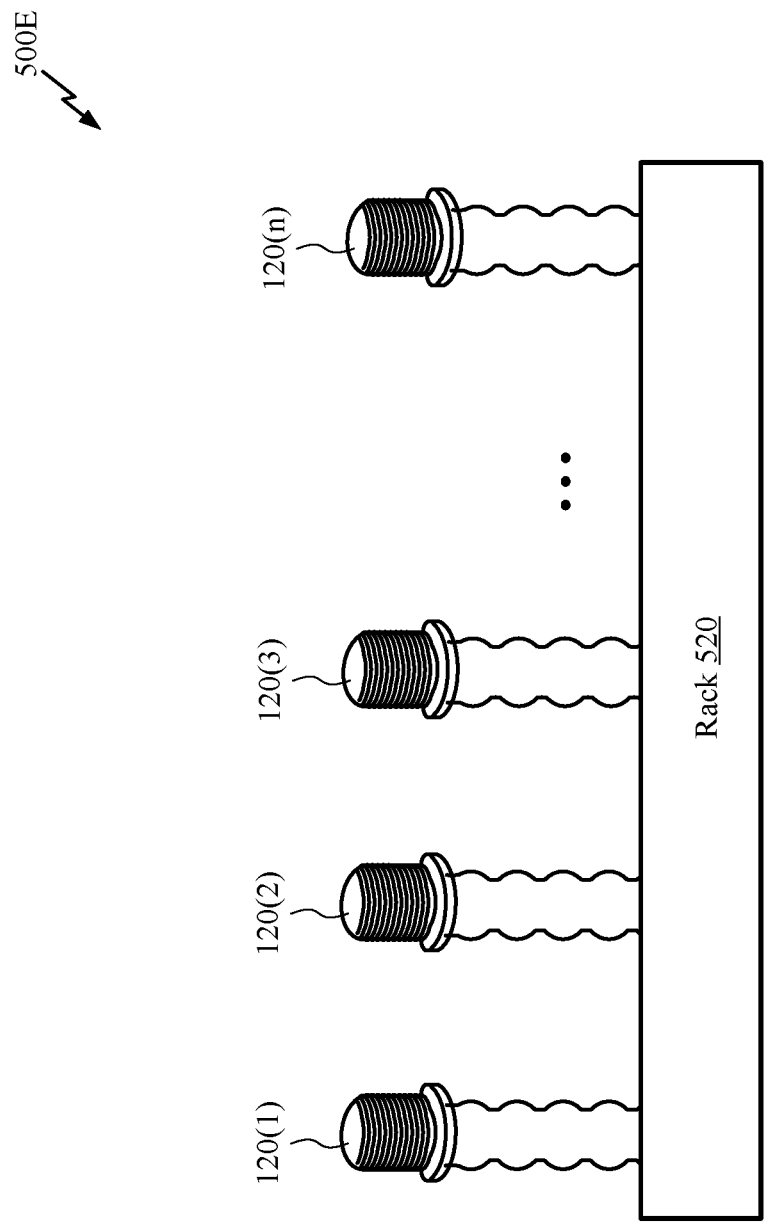

In some implementations, the axle 120 can be manufactured using suitable techniques, placed on a rack in either a vertical or horizontal orientation, and then the rack can be mated with the mold 510, for example, so that the second end 120B of the axle is disposed within the mold 510 for manufacture of the pedal 100 (as described above with respect to FIGS. 5A-5D). In some aspects, the rack can hold or contain a multitude of axles 120. For example, FIG. 5E shows an illustration 500E depicting a plurality of axles 120(1)-120(n) positioned on a rack 520. The rack 520, which can hold any suitable number of axles 120, can then be mated with a corresponding plurality of molds 510 (not shown for simplicity) so that a plurality of pedals 100 can be manufactured at the same time.

FIG. 6A shows an illustrative flow chart depicting an example method 600A for manufacturing the pedal 100. The method 600A can be performed by any suitable entity such as, for example, a manufacturer. First, the manufacturer can provide an axle 120 having a first end 120A and a second end 120B, the first end 120A configured to be received by a crank arm of a bicycle (602). Then, the manufacturer can form a pedal body 110 around the second end 120B of the axle 120 using via injection molding (604). In some aspects, the manufacturer can apply a finishing material on a surface of the second end 120B of the axle 120 to form the pedal body 110 (604A), can insert the second end 120B of the axle 120 into a mold (604B), and can inject a material into the mold to form the pedal body 110 around the second end 120B of the axle 120 (604C).

FIG. 6B shows an illustrative flow chart depicting another example method 650 for manufacturing the pedal 100. The method 650 can be performed by any suitable entity such as, for example, a manufacturer. First, the manufacturer can provide an axle 120 having a first end 120A and a second end 120B, the first end 120A configured to be received by a crank arm of a bicycle (652). Then, the manufacturer can form a pedal body 110 around the second end 120B of the axle 120 using liquid plastic (654). In some implementations, the manufacturer can apply a finishing material on a surface of the second end 120B of the axle (654A), can insert the second end 120B of the axle 120 into a mold (654B), can inject liquid plastic into the mold around the axle 120 to form the pedal body 110 around the second end 120B of the axle 120 (654C), and can use a suitable chemical curing technique to cure the liquid plastic until it sufficiently hardens to form the pedal body 110 around the second end 120B of the axle 120 (654D). In some aspects, the chemical curing technique may be implemented using an oven. The use of liquid plastic to form the pedal body 110 may minimize shrinkage of the plastic during manufacture of the pedal body 110 and increase the ability with which the axle 120 may freely spin within the cavity 312 of the pedal body 110, for example, as compared to using injection molding to form the pedal body 110.

In some other implementations, thermal expansion may be employed during manufacture of the pedal 100. More specifically, the axle 120 may be heated (such as to a first temperature) prior to insertion into the mold for example, to increase the diameter of the axle 120. Then, once inserted into the mold, the axle 120 may be cooled or chilled (such as to a second temperature that is less than the first temperature), for example, so that the axle 120 shrinks and creates space for the pedal body 110 to spin about the axle 120. In this manner, aspects of the present disclosure may compensate for the shrink rate of plastics.

In addition, or in the alternative, the axle 120 may be dipped into a wax, release agent, or other suitable lubricant that melts away when hot plastic is injected into the mold to form the pedal body 110 around the axle 120, for example, to create space for the pedal body 110 to spin about the axle 120.

Figure 7A:
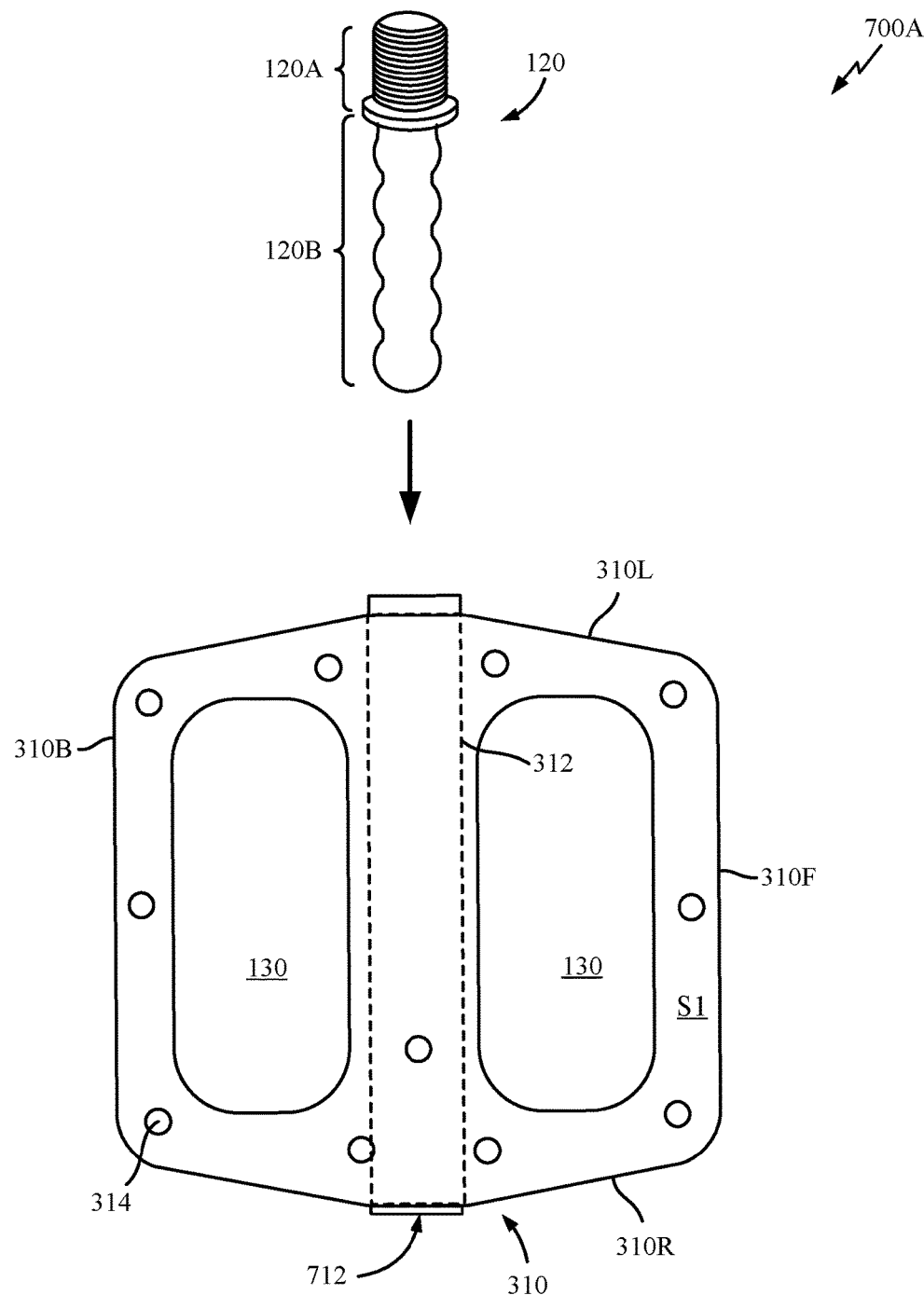
FIGS. 7A-7B depict another example method for manufacturing a pedal in accordance with aspects of the present disclosure.

An example method for manufacturing the pedal 300 of FIGS. 3A-3C is described below with respect to FIGS. 7A-7B. Although described below with respect to the pedal 300 FIGS. 3A-3C, the method is equally applicable to manufacturing the pedal 400 described above with respect to FIGS. 4A-4C, as well as for manufacturing pedal 300 to include other shapes and configurations of axle 120. The method is described below with respect to the example illustrations 700A and 700B shown in FIGS. 7A and 7B, respectively. The pedal body 310 can be any suitable pedal body, and can be manufactured prior to or during the method described herein.

In some implementations, the pedal body 310 can be formed using plastic injection molding techniques, and a central portion of the pedal body 310 can be removed to form the cavity 312. In other implementations, the pedal body 310 can be formed using liquid plastic and then cured until the liquid plastic sufficiently hardens to form the pedal body 110. In some aspects, the cavity 312 can be formed by machining (such as drilling or other similar technique) a hole or recess within the pedal body 310 until the desired cavity 312 is created. For other implementations, the pedal body 310 can be formed using conventional pressing techniques, and a central portion of the pedal body 310 can be removed to form the cavity 312 using any suitable techniques. For still other implementations, the pedal body 310 can be any suitable conventional pedal body readily available to consumers including, for example, pedal bodies purchased from a store, used pedal bodies, and the like, and a central portion of the pedal body 310 can be removed to form the cavity 312 using any suitable techniques.

The pedal body 310 can be mounted on a rack or other suitable structure (not shown for simplicity) for maintaining the pedal body in a stationary position. For the example method depicted by the illustrations 700 and 700B in FIGS. 7A and 7B, respectively, the cavity 312 can extend through the central portion of the pedal body 310, for example, so that the cavity 312 is open at both ends. A plug 712 can be inserted into a distal end of the cavity 312, thereby essentially sealing the distal end of the cavity 312.

Figure 7B:
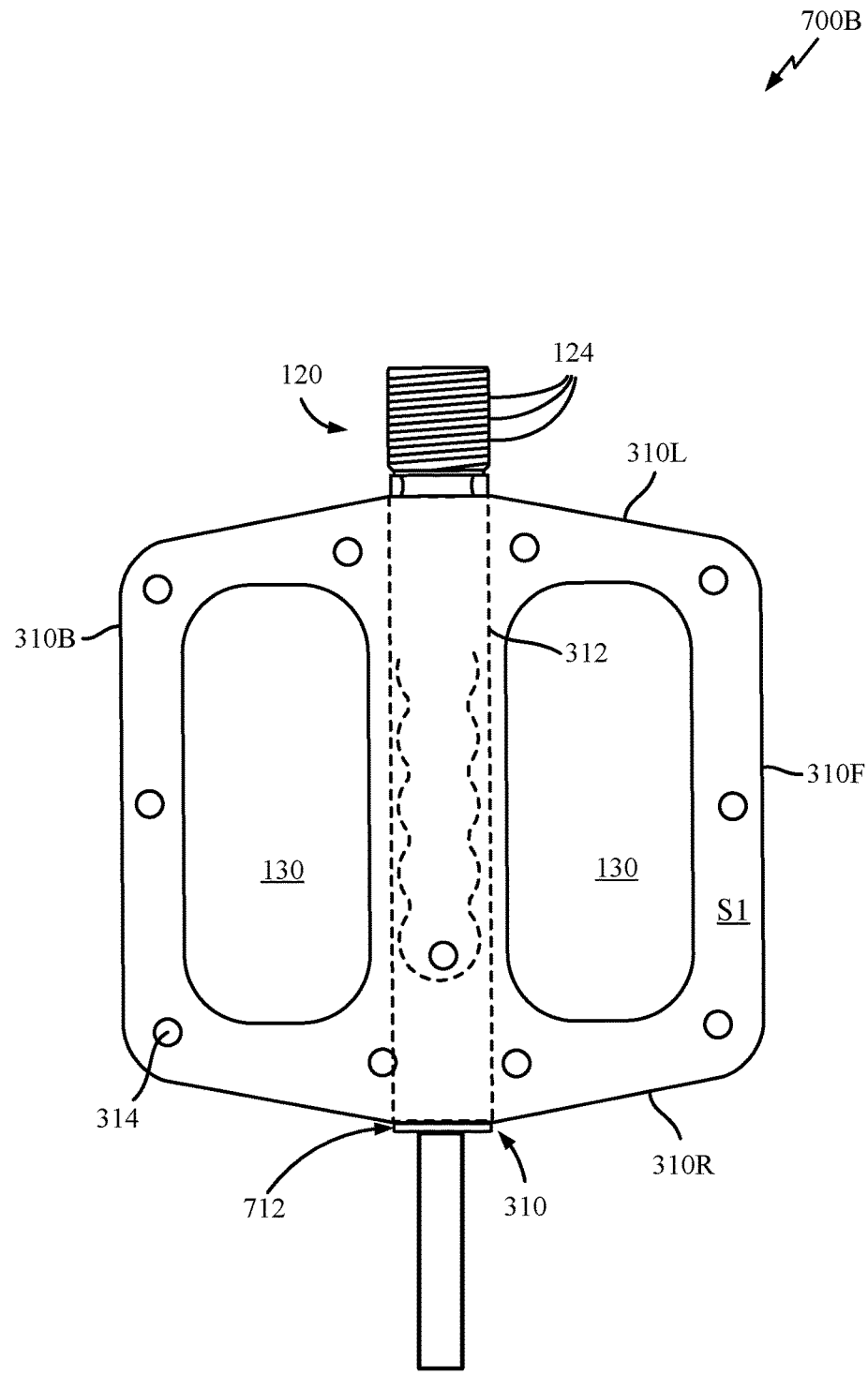

Then, referring to FIG. 7B, the axle 120 can be inserted into a proximate end of the cavity the cavity 312 of the pedal body 310. Next, a filler material can be inserted or injected into the cavity to fill any spaces between the cavity 312 and the axle 120 or 220. In some implementations, the filler material can be a plastic molded injection. In other implementations, the filler material can be a liquid plastic that is hardened using a suitable chemical curing process (such as using an oven to cure the liquid plastic until it hardens).

Although this invention has been disclosed in the context of certain embodiments and examples, it will be understood by those skilled in the art that the invention extends beyond the disclosed embodiments to other alternative embodiments and/or uses of the invention and obvious modifications and equivalents thereof. Additionally, it is contemplated that various aspects and features of the invention described can be practiced separately, combined together, or substituted for one another, and that a variety of combination and sub-combinations of the features and aspects can be made and still fall within the scope of the invention. Thus, it is intended that the scope of the invention should not be limited by the above description, but should be determined only by the claims While particular aspects of the present disclosure have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

In accordance with aspects of the present disclosure, the bicycle pedals disclosed herein may be manufactured according to example claims provided below:

1. A method of manufacturing a bicycle pedal, comprising:
    providing an axle having a first end and a second end, the first end configured to be received by a crank arm of a bicycle; and
    forming a pedal body around the second end of the axle using injection molding or a chemical curing of liquid plastic.
2. The method of claim 1, wherein the second end of the axle is configured to rotate within the pedal body after the pedal body is formed.
3. The method of claim 1, wherein the pedal consists of a single piece after the manufacturing.
4. The method of claim 1, wherein forming the pedal body comprises:
    applying a finishing material on a surface of the second end of the axle;
    inserting the second end of the axle into a mold; and injecting a material into the mold to form the pedal body around the second end of the axle.

5. The method of claim 4, further comprising:
removing the pedal, integrally formed to consist of only the pedal body and the axle, from the mold.

6. The method of claim 4, wherein the material comprises a thermoplastic resin.

7. The method of claim 4, wherein the finishing material is one or more of a chrome layer and a mold release agent.

What is claimed is:

1. A bicycle pedal consisting of:
a pedal body including a pair of surfaces interchangeably configured to receive a foot; and
an axle having a first end configured to be received by a crank arm of a bicycle and having a second end received into the pedal body and irremovably disposed within the pedal body, wherein the axle is configured to rotate with respect to the pedal body, wherein the second end is configured to rotate freely within the pedal body without a bearing system, and wherein the pedal body consists of a unibody structure formed around the axle.

2. The bicycle pedal of claim 1, wherein the unibody structure comprises liquid plastic chemically cured around the axle.

3. The bicycle pedal of claim 1, wherein the pedal body consists of either:
a plastic injected molding formed around the second end of the axle; or
a liquid plastic provided within a mold and chemically cured.

4. The bicycle pedal of claim 1, wherein the second end of the axle includes a number of protrusions configured to prevent removal of the second end of the axle from the pedal body.

5. The bicycle pedal of claim 1, wherein the pedal body comprises a plurality of components.

6. The bicycle pedal of claim 5, wherein the second end of the axle is received within a cavity of the pedal body.

7. The bicycle pedal of claim 6, wherein the second end of the axle includes a number of protrusions configured to prevent removal of the second end of the axle from the cavity.

8. The bicycle pedal of claim 6, further comprising a filler material disposed within the cavity and surrounding the second end of the axle.

9. The bicycle pedal of claim 8, wherein the filler material comprises one of a plastic molded injection and a chemically cured liquid plastic.

10. A bicycle pedal including only a first piece and a second piece, the bicycle pedal characterized by:
the first piece consists of a pedal body including a pair of surfaces interchangeably configured to receive a foot; and
the second piece consists of an axle having a first end and a second end, wherein the first end is configured to be received by a crank arm of a bicycle, wherein the second end is received into a cavity of the pedal body and is irremovably disposed within the pedal body, wherein the second end is configured to rotate freely within the pedal body without a bearing system, and wherein the first piece consists of a unibody structure formed around at least a portion of the second piece.

11. The bicycle pedal of claim 10, wherein the first piece is configured to rotate with respect to the second piece.

12. The bicycle pedal of claim 10, wherein the unibody structure comprises liquid plastic chemically cured around the axle.

13. The bicycle pedal of claim 10, wherein the first piece consists of either:
a plastic injected molding formed around at least a portion of the second piece; or
a liquid plastic provided within a mold and chemically cured.

14. The bicycle pedal of claim 10, further comprising a filler material disposed within the cavity and configured to fill a space between the second end of the axle and the cavity.

15. The bicycle pedal of claim 14, wherein the second piece includes a number of protrusions configured to prevent removal of the second piece from the first piece.

16. The bicycle pedal of claim 15, wherein the second piece is received within the cavity of the first piece, and the number of protrusions are configured to rotate within the cavity.

* * * * *